(12) United States Patent
Miller et al.

(10) Patent No.: US 8,050,734 B2
(45) Date of Patent: Nov. 1, 2011

(54) METHOD AND SYSTEM FOR PERFORMING PATIENT SPECIFIC ANALYSIS OF DISEASE RELEVANT CHANGES OF A DISEASE IN AN ANATOMICAL STRUCTURE

(75) Inventors: James Vradenburg Miller, Clifton Park, NY (US); Paulo Ricardo dos Santos Mendonca, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 406 days.

(21) Appl. No.: 11/220,782

(22) Filed: Sep. 7, 2005

(65) Prior Publication Data

US 2007/0053560 A1    Mar. 8, 2007

(51) Int. Cl.
*A61B 5/05* (2006.01)
(52) U.S. Cl. ......... 600/407; 600/381; 600/587; 382/128
(58) Field of Classification Search ........... 600/407–480
See application file for complete search history.

(56) References Cited

U.S. PATENT DOCUMENTS

| | | | |
|---|---|---|---|
| 5,197,470 A * | 3/1993 | Helfer et al. | 600/342 |
| 6,466,687 B1 * | 10/2002 | Uppaluri et al. | 382/128 |
| 2003/0120182 A1 * | 6/2003 | Wilkinson et al. | 600/587 |
| 2004/0101176 A1 * | 5/2004 | Mendonca et al. | 382/128 |
| 2004/0101182 A1 | 5/2004 | Miller et al. | |
| 2005/0082479 A1 * | 4/2005 | Wallace et al. | 250/330 |
| 2005/0105788 A1 | 5/2005 | Turek et al. | |
| 2005/0135707 A1 | 6/2005 | Turek et al. | |
| 2006/0013454 A1 * | 1/2006 | Flewelling et al. | 382/128 |
| 2007/0010702 A1 * | 1/2007 | Wang et al. | 600/8 |

* cited by examiner

*Primary Examiner* — Brian Casler
*Assistant Examiner* — Nasir Shahrestani
(74) *Attorney, Agent, or Firm* — Jason K. Klindtworth

(57) ABSTRACT

A method for performing patient specific analysis of disease relevant changes of a disease in an anatomical structure of interest is provided. The method comprises determining a percentage of the anatomical structure that is encompassed by a diseased tissue region using a patient specific healthy tissue model. The method then comprises determining the amount or spatial distribution or a combination thereof of tissue volume variation due to the disease in the anatomical structure based on the percentage of the anatomical structure encompassed by the diseased tissue region and an estimated original amount of tissue.

24 Claims, 3 Drawing Sheets

METHOD AND SYSTEM FOR PERFORMING PATIENT SPECIFIC ANALYSIS OF DISEASE RELEVANT CHANGES OF A DISEASE IN AN ANATOMICAL STRUCTURE

BACKGROUND

The invention relates generally to a method and system for processing medical image data to aid in the detection and diagnosis of disease. More particularly, the invention relates to a method and system for processing medical image data to perform patient specific analysis of disease relevant changes in diseases such as chronic obstructive pulmonary disease.

Chronic Obstructive Pulmonary Disease (COPD) is a leading cause of death in the United States and other countries. COPD has two main disease processes, namely, tissue destruction (emphysema) and airway inflammation (chronic bronchitis). At present, there is no known treatment that can reverse the progress of the disease. At best, the progress of the disease can only be halted. Thus, there is a premium placed on its early disease diagnosis and treatment. With early diagnosis and effective treatment, a patient's quality of life can be improved.

COPD is identified based on symptoms including coughing, wheezing, and shortness of breath (dyspnea). COPD includes a number of respiratory diseases, the most prominent of which are emphysema and chronic bronchitis. COPD affects large airways, small airways and parenchyma in patients. Diseases are typically caused by smoking and air pollution, and are linked to genetic predisposition causing alpha-anti-elastase deficiency.

Emphysema, or airspace destruction, is the most prominent feature of parenchymal change in COPD patients. Emphysema is the result of the loss of elastic recoil of lung tissue. There are four types of emphysema: centrilobular, panlobular or panacinar, distal acinar or paraseptal, and irregular. The first two types contribute to the majority of emphysematous COPD. The classification is based on the anatomical distribution of airspace destruction within a lobule, which is a cluster of acini. Currently, emphysema can be classified only through post mortem examination. Emphysema is typically diagnosed by gross physiological responses, medical imaging and post mortem anatomical inspection.

An X-ray chest radiograph system is the more commonly used diagnostic tool for the purpose of detecting lung disease in humans. Lung diseases such as bronchitis, emphysema and lung cancer are also detectable in Computed Tomography (CT). However, CT systems generally provide over 80 separate images for a single CT scan thereby providing a considerable amount of information to a radiologist for use in interpreting the images and detecting suspect regions that may indicate disease.

The use of high resolution CT image data is a promising technique for diagnosing diseases of the lung. However, in diseases such as emphysema, it is difficult for a radiologist to classify the extent of disease progression by only looking at the CT images since one of the more prominent disease indicators of emphysema is degradation of the alveoli and other tissue changes of the lung, which are currently difficult to measure from CT image data.

Some known diagnosis techniques have attempted to use simple CT images to attempt to quantify emphysema. Some of these techniques include using feature-based analysis, CT metrics such as density masks, AMFM and fractal analysis. However, the above techniques are not based on an underlying model of the disease and the reliability of the results obtained with these techniques can be affected by variable scan parameters and scanner calibration as well as other disease pathologies. In addition, known techniques do not provide estimates of the rate or location of tissue destruction, are not based on "patient specific statistics", and typically only provide evidence of the progression of the disease for a patient based on population statistics.

Therefore, there is a need for a method and system for measuring disease relevant tissue changes in medical images to enable the diagnosis and tracking of various forms of COPD. Also, what is needed is a method and system for performing "patient specific analysis" of disease relevant changes of diseases such as COPD.

BRIEF DESCRIPTION

Embodiments of the present invention address this and other needs. In one embodiment a method for performing patient specific analysis of disease relevant changes of a disease in an anatomical structure of interest is provided. The method comprises determining a percentage of the anatomical structure that is encompassed by a diseased tissue region using a patient specific healthy tissue model and determining the amount or spatial distribution or a combination thereof of tissue volume variation due to the disease in the anatomical structure based on the percentage of the anatomical structure encompassed by the diseased tissue region and an estimated original amount of tissue.

In another embodiment, a system for performing patient specific analysis of disease relevant changes of a given disease in an anatomical structure of interest is provided. The system comprises an imaging device for acquiring image data corresponding to the anatomical structure. The system further comprises an image processor coupled to the imaging device. The image processor is configured to determine a percentage of the anatomical structure that is encompassed by a diseased tissue region using a patient specific healthy tissue model. The image processor is further configured to determine the amount or spatial distribution or a combination thereof of tissue volume variation due to the disease in the anatomical structure based on the percentage of the anatomical structure encompassed by the diseased tissue region and an estimated original amount of tissue.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
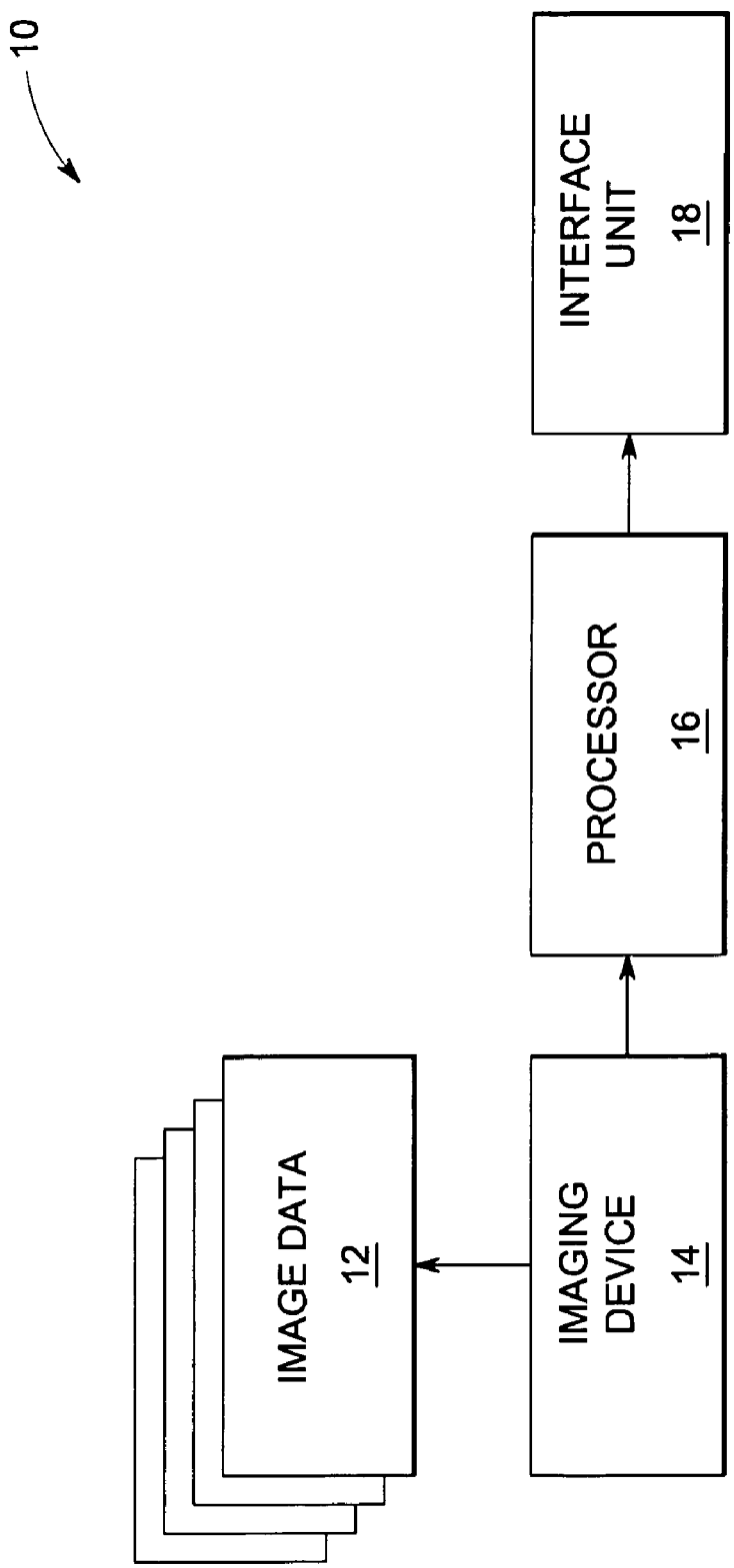
FIG. 1 is a block diagram illustration of a medical imaging system for which embodiments of the present invention are applicable.

Referring to FIG. 1, a general block diagram of a system 10 for disease detection is shown. System 10 includes an imaging device 14, which can be selected from a number of medical imaging devices known in the art for generating a plurality of images such as computed tomography (CT) and X-ray.

During a CT imaging session, a patient is placed within the imaging device and is exposed to a plurality of X-rays measured with an arrangement of X-ray detectors. A beam of X-rays passes through a particular thin cross-section or "slice" of the patient. The detectors measure the amount of transmitted radiation. This information is used to compute the X-ray attenuation coefficient for sample points in the body. A gray scale image is then constructed based upon the calculated X-ray attenuation coefficients. The shades of gray in the image represent the amount of X-ray absorption of every point within the slice. The slices obtained during a CT session can be reconstructed to provide an anatomically correct representation of the area of interest within the body that has been exposed to the X-rays.

Referring to FIG. 1 again, the system 10 includes an imaging device 14, a processor 16 and an interface unit 18. Imaging device 14 is adapted to generate a plurality of image data sets 12 and is, for example, a computed tomography (CT) scanner. In the context of CT, acquisition of image data is generally referred to as "scans". In an exemplary embodiment, the images are acquired using a CT imaging device. Processor 16 is configured to perform computations in accordance with embodiments of the present invention, which will be described in greater detail with reference to FIG. 2. Processor 16 is also configured to perform computation and control functions for well-known image processing techniques such as reconstruction, image data memory storage, segmentation and the like. Processor 16 may comprise a central processing unit (CPU) such as a single integrated circuit, such as a microprocessor, or may comprise any suitable number of integrated circuit devices and/or circuit boards working in cooperation to accomplish the functions of a central processing unit. Processor 16 desirably includes memory. Memory within processor 16 may comprise any type of memory known to those skilled in the art. This includes Dynamic Random Access Memory (DRAM), Static RAM (SRAM), flash memory, cache memory, etc. While not explicitly shown in FIG. 1, the memory may be a single type of memory component or may be composed of many different types of memory components. Processor 16 is also capable of executing the programs contained in memory and acting in response to those programs or other activities that may occur in the course of image acquisition and image viewing. As used herein, "adapted to", "configured" and the like refer to mechanical or structural connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

Interface unit 18 is coupled to processor 16 and is adapted to allow human users to communicate with system 10. Processor 16 is further adapted to perform computations that are transmitted to interface unit 18 in a coherent manner such that a human user is capable of interpreting the transmitted information. Transmitted information may include images in 2D or 3D, color and gray scale images, and text messages regarding diagnosis and detection information. Interface unit 18 may be a personal computer, an image workstation, a hand held image display unit or any conventional image display platform generally grouped as part of a CT or MRI system.

All data gathered from multiple scans of the patient is to be considered one data set. Each data set can be broken up into smaller units, either pixels or voxels. When the data set is two-dimensional, the image is made up of units called pixels. A pixel is a point in two-dimensional space that can be referenced using two-dimensional coordinates, usually x and y. Each pixel in an image is surrounded by eight other pixels, the nine pixels forming a three-by-three square. These eight other pixels, which surround the center pixel, are considered the eight-connected neighbors of the center pixel. When the data set is three-dimensional, the image is displayed in units called voxels. A voxel is a point in three-dimensional space that can be referenced using three-dimensional coordinates, usually x, y and z. Each voxel is surrounded by twenty-six other voxels. These twenty-six voxels can be considered the twenty-six connected neighbors of the original voxel.

As part of acquiring the image data, it is to be appreciated by one skilled in the art that appropriate patient scanning protocol is needed. For example, chest exams using CT typically require the patient (subject) to hold their breath to reduce motion artifacts in the image data due to patient respiration. Usually, CT exams are taken during full inspiration or full expiration. Further, contrast agents may be used to attenuate the x-ray radiation in particular areas of the body. Contrast agents help improve the differentiation between tissues which are affected by the contrast agents and tissues which are not affected. In the CT image, a CT number difference between contrasted and non-contrasted tissues will be larger than normal. Contrast agents are administered to the patient orally, intravenously or rectally.

Once image data is acquired from the imaging methods described above, image processor 16 is adapted to perform processing to measure disease relevant tissue changes in accordance with embodiments of the present invention. In particular, and as will be described in greater detail below, the image processor 16 is configured to identify a healthy tissue region in the lung and build a patient specific healthy tissue model based on the healthy tissue region. The image processor 16 is further configured to use the patient specific healthy tissue model to determine a percentage of the lung that is encompassed by a diseased tissue region, estimate an original amount of tissue present in the lung based on the patient specific healthy tissue model and a patient specific measurement of the volume of the lung and determine the amount or spatial distribution or a combination thereof of tissue volume variation in the lung based on the percentage of the anatomical structure encompassed by the diseased tissue region and the estimated original amount of tissue.

Figure 2:
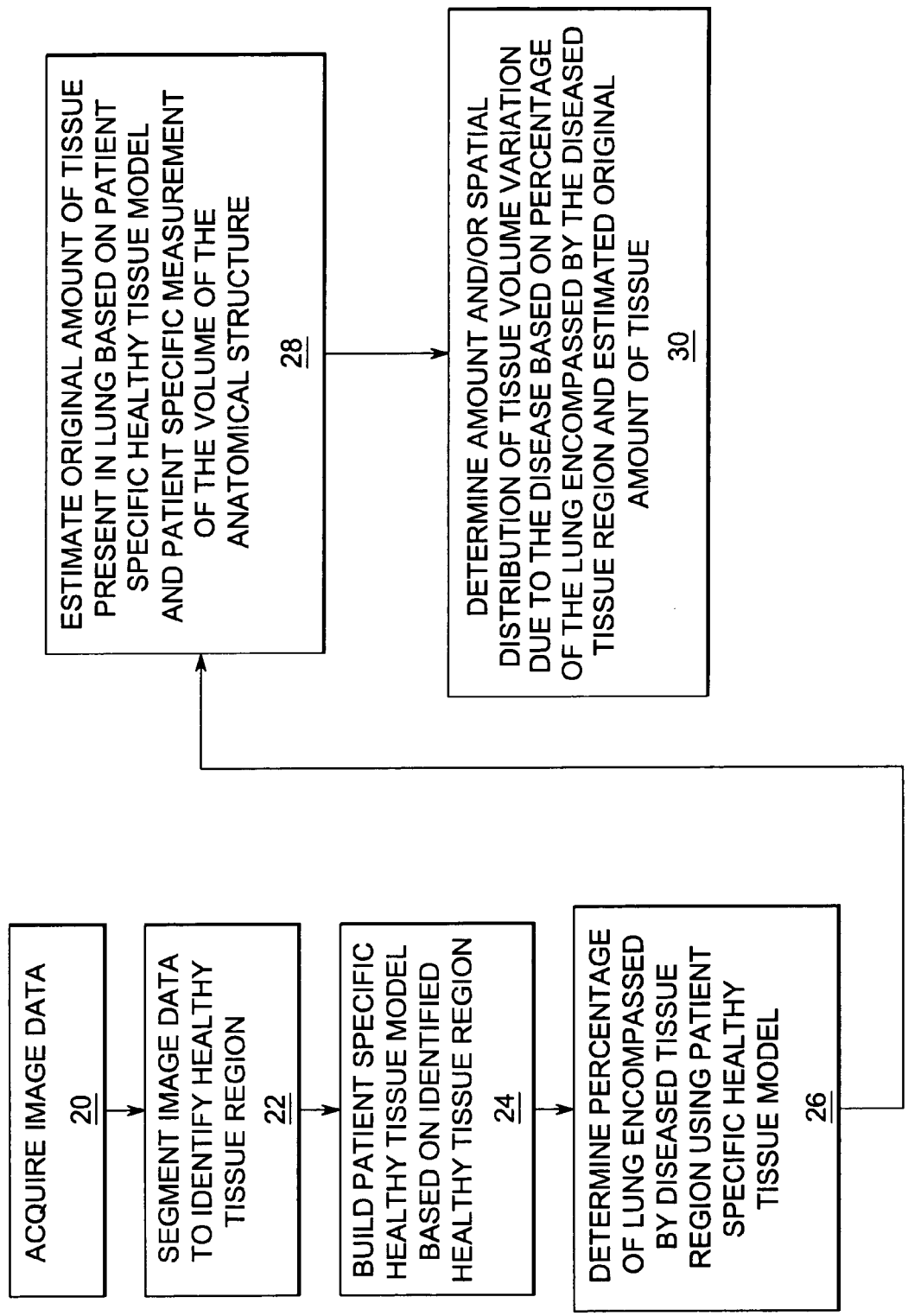
FIG. 2 is a flowchart describing exemplary steps for performing patient specific analysis of disease relevant changes of a disease in an anatomical structure of interest.

FIG. 2 is a flowchart describing exemplary steps for performing patient specific analysis of disease relevant changes of a disease in an anatomical structure of interest. In one embodiment of the present invention, the disease of interest is COPD, and in particular, "emphysema", and the anatomical structure of interest is a "lung". As used herein, the term "disease relevant changes" refers to changes associated with the disease of interest. As will be appreciated by those skilled in the art, the intensity of affected areas of the lung and the regions of the affected areas of the lung are indicators of the presence of emphysema and changes in these aspects indicate progression of the disease. Therefore, measuring tissue changes and the volume of the lung area are key indicators in the diagnosis and staging of emphysema. As will be described in greater detail below, embodiments of the present invention disclose a technique that estimates the amount and/or spatial distribution of the tissue volume variation in the lung due to emphysema, by identifying the portions of the lung tissue that have not been impacted by the disease.

Referring to FIG. 2 again, in step 20, the image data is acquired using one of a computed tomography (CT) system or an x-ray system in a manner as described above.

In step 22, the image data acquired at step 20 is segmented to identify a healthy tissue region in the lung. In one embodiment of the present invention, identifying the healthy tissue region in the lung comprises segmenting the lung into one or more regions based on the attenuation properties of the tissue in the lung. In a particular embodiment, the segmenting process identifies a healthy tissue region in the lung as a region having consistent attenuation properties and a diseased tissue region as a region in the lung having a wide variety of attenuations, wherein the degree of attenuation is a function of the severity of the disease. As will be appreciated by those skilled in the art, many various known segmenting techniques may be applied to the image data to extract relevant image information or suspicious regions for the disease.

In step 24, a patient specific healthy tissue model is built based on the healthy tissue region identified in step 22. In one embodiment of the present invention, the patient specific healthy tissue model is built based on a statistical model of the attenuation properties of the healthy tissue region for a given patient. The statistical model may be based on one or more statistical measures associated with the pixels in the healthy tissue region, such as for example, the mean or variance of the pixels in the healthy tissue region. In certain other embodiments, the patient specific healthy tissue model may be built based on classifiers, model-based methods or regression analysis. A number of classifiers are known in the art. A parametric classifier may define a distribution (such as, for example, a Gaussian distribution) based on the statistical measures across the healthy tissue and then measure the probability that a given tissue is healthy by evaluating this probability. A nonparametric classifier may define an implicit distribution (such as, for example, a histogram or kernel estimator) and evaluate the probability of the tissue being healthy. A model-based method may use a goodness of fit test or model-derived thresholds to define whether the tissue matches the model sufficiently.

In step 26, a second segmenting process is applied to the lung to perform a fine segmentation of the healthy tissue region from the diseased tissue region identified in step 22. In particular, the second segmenting process determines a percentage of the lung that is encompassed by the diseased tissue region using the patient specific healthy tissue model. In one embodiment, the segmenting process classifies each pixel in the lung into either the healthy tissue region or the diseased tissue region by measuring a goodness of fit or likelihood of each pixel in the lung tissue with respect to the patient specific healthy tissue model. In an alternate embodiment, the classification is based on a pixel neighborhood basis, wherein a group of pixels are classified into either the healthy tissue region or the diseased tissue region in the lung based on the probability that all the pixels that belong to a given neighborhood are identified as either healthy or diseased.

In step 28, an original amount of tissue present in the lung is estimated based on the patient specific healthy tissue model determined in step 24 and a patient specific measurement of the volume of the anatomical structure. As used herein, the "original amount of tissue" is an estimate of the mass and volume of lung tissue that a patient had before he/she was impacted by the disease and the "patient specific measurement of the volume of the lung" generally refers to the volume of the lung that is encompassed by both the healthy and the diseased tissue. In accordance with embodiments of the present invention, and as will be described in greater detail below, the estimate of the original amount of lung tissue for a patient is used as a baseline measurement to estimate the volume of tissue variation due to the disease in a patient. In one embodiment of the present technique, the "original amount of tissue" present in the lung is estimated based on the product of the density estimate from the patient specific healthy tissue model and the patient specific measurement of the volume of the lung.

In an alternate embodiment, the original amount of tissue present in the lung is estimated based on measuring a patient specific lung overinflation amount. The amount of overinflation is used to produce an improved estimate of the original amount of lung tissue. In accordance with this embodiment, the "original amount of tissue" present in the lung may be determined by an extrapolation that estimates the amount of overinflation of the lung volume in the diseased portion of the lung. This estimate of the overinflation is then used to determine a refined estimate of the "original lung volume" for the patient. Then, the "original amount of lung tissue" for the patient is estimated by substituting the patient specific estimate of the "original lung volume" by the patient specific measurement of the volume of the lung.

A number of techniques may be used to determine the amount of overinflation. These techniques generally make use of a shape model. The shape model may be implicit, enforcing curvature constraints on the boundary of the lung. Alternatively, the shape model may be explicit, detailing a particular overall shape for the lung. The latter is generally based on a "model fitting" approach wherein the model may be a prescribed parametric model or be based on shape models from a population. In certain other embodiments, regression based techniques may also be used to predict the amount of overinflation as a function of the amount of healthy lung tissue and the (biased) estimate of the lung volume (biased by the overinflation). This is generally represented as a curve fit that describes the true lung volume based on a given amount of healthy tissue (or even just lung mass) and the estimate of the lung volume. Optionally, the curve may also be derived from a number of patients under observation.

In step 30, the amount and/or spatial distribution of tissue volume variation due to the disease in the lung is determined based on the percentage of the lung encompassed by the diseased tissue region determined in step 26 and the estimated original amount of tissue in the lung determined in step 28. As used herein, the "spatial distribution" refers to the spatial locations of the diseased lung tissue and the relationship of these locations to other diseased regions and the relationship of these locations to the healthy lung tissue. For instance, the disease portions of the lung may be limited to the superior or inferior portions of the lung, the diseased portions may be concentrated or clustered in one or a few regions or the diseased portions may be more uniformly spread throughout the lung. In a particular embodiment, the amount and/or spatial distribution of "tissue loss" due to the disease is estimated. However, it is to be appreciated that embodiments of the present invention may also be used to estimate the amount and/or spatial distribution of "tissue volume gained" due to diseases indicated by tissue gain or volume gain, such as, for example, such as lung cancer, tumors etc.

Figure 3:
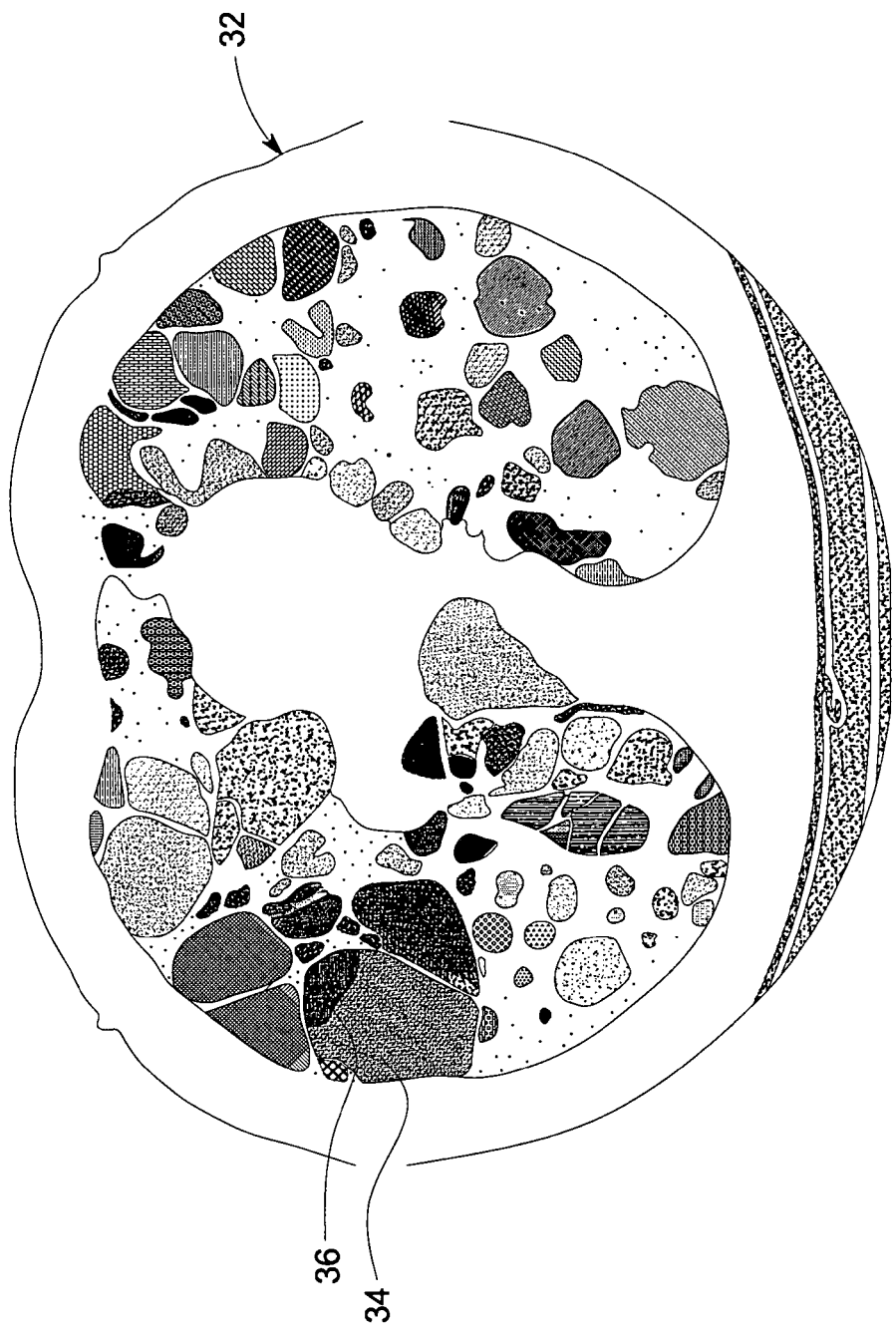
FIG. 3 is an illustration of an exemplary lung image indicating exemplary diseased tissue regions for which embodiments of the present invention are applicable.

Once the processing described above is complete, the method may further comprise generating an output of the display of the analysis results. In one embodiment, the output includes displaying highlighted regions in the image where the highlighted regions correspond to values from the analysis. In a particular embodiment, the percentage of the anatomical structure encompassed by the diseased tissue region for a patient is displayed. More specifically, the displayed output includes highlighting each pixel based on its inclusion in a healthy tissue region or a diseased tissue region within the lung and based on the severity of the disease within a diseased tissue region. FIG. 3 is an illustration of an exemplary lung image indicating exemplary diseased tissue regions. As shown in FIG. 3, reference numeral 34 indicates an exemplary diseased region in the lung image 32 and reference numeral 36 indicates the degree of severity within the exemplary diseased region 34. Further, in accordance with this embodiment, the highlighted regions in the lung are displayed overlaying the image data. The display may be 2D or 3D.

In an alternate embodiment of the present invention, the rate of progression of the disease in the anatomical structure is compared between at least one pair of longitudinal exams. As used herein, "longitudinal exams" refer to one or more patient exams or images acquired for the anatomical structure of interest but at different points in time. The longitudinal exams are compared for signs of change that may indicate disease relevant changes in the anatomical structure of interest. In a particular embodiment of the present invention, the rate of progression of the disease between the longitudinal patient exams is displayed, wherein the display comprises highlighting each pixel in the diseased tissue region of the pair of longitudinal exams distinctly. More specifically, the highlighting is an indication of the progression of the disease between the pair of longitudinal exams.

Embodiments of the present invention have several advantages including the ability to perform patient specific analysis of disease relevant changes of a disease in an anatomical structure of interest. The disclosed embodiments are based on the specifics of the patient as opposed to population statistics and are hence more precise and robust to variations in scanning protocols and scanner calibration. Also, and as described above, embodiments of the present invention estimate the amount and/or spatial distribution of tissue loss due to the disease in the anatomical structure based on a percentage of the anatomical structure encompassed by the diseased tissue region and an estimated original amount of tissue.

Further, the embodiments of the invention presented above focus on the disease relevant changes relating to emphysema in the lung, but it is to be appreciated that other biological changes in other anatomical structures may also benefit from the disclosed embodiments. For example, the embodiments of the present invention may also be applied to detecting disease relevant changes in the liver, lung or pancreas. Also, and as mentioned above, embodiments of the present invention may be applied to quantify the amount of "tissue gained" due to the disease, such as, for example, to detect lung diseases such as lung cancer, tumors etc.

As will be appreciated by those skilled in the art, the embodiments and applications illustrated and described above will typically include or be performed by appropriate executable code in a programmed computer. Such programming will comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources based upon raw or partially processed image data.

In the context of the present technique, the computer-readable medium is any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for performing patient specific analysis of disease relevant changes of a disease in an anatomical structure of interest, the method comprising:
   acquiring image data corresponding to the anatomical structure of interest;
   identifying at least one healthy tissue region in the anatomical structure of interest based on attenuation properties of tissue in the anatomical structure of interest;
   building a patient specific healthy tissue model based on one or more statistical parameters associated with pixels in the identified healthy tissue region for a given patient;
   determining a percentage of the anatomical structure that is encompassed by a diseased tissue region using the patient specific healthy tissue model;
   applying a segmenting process to the image data to determine the percentage of the anatomical structure that is encompassed by the diseased tissue region, wherein the segmenting process identifies the percentage of the anatomical structure encompassed by the diseased tissue region by classifying each pixel within the anatomical structure into either a healthy tissue region or a diseased tissue region within the anatomical structure;
   determining the amount or spatial distribution or a combination thereof of tissue volume variation due to the disease in the anatomical structure based on the percentage of the anatomical structure encompassed by the diseased tissue region and an estimated original amount of tissue; and
   displaying the percentage of the anatomical structure encompassed by the diseased tissue region.

2. The method of claim 1, wherein the patient specific analysis of the disease is performed using image data corresponding to the anatomical structure, and wherein the image data is acquired using at least one of computed tomography (CT), and X-ray.

3. The method of claim 1, wherein the disease is chronic obstructive pulmonary disease (COPD) and the anatomical structure of interest is a lung.

4. The method of claim 1, wherein the identification of the healthy tissue region comprises applying a segmenting process to the image data, and wherein the segmenting process is based on the attenuation properties of the healthy tissue region.

5. The method of claim 1, wherein the patient specific healthy tissue model is a statistical model of the attenuation properties of the healthy tissue region.

6. The method of claim 1, wherein the patient specific healthy tissue model is generated using at least one of classifiers, model-based methods or regression analysis techniques.

7. The method of claim 1, wherein the classification is based on measuring a goodness of fit for each pixel within the anatomical structure with respect to the patient specific healthy tissue model.

8. The method of claim 1, wherein the original amount of tissue in the anatomical structure is estimated based on the patient specific healthy tissue model and a patient specific measurement of the volume of the anatomical structure.

9. The method of claim 8, wherein the original amount of tissue is estimated based on a pixel density in the patient specific healthy tissue model and the patient specific measurement of the volume of the anatomical structure.

10. The method of claim 1, wherein the original amount of tissue in the anatomical structure is estimated based on measuring a patient specific lung overinflation amount.

11. The method of claim 1, wherein the displaying comprises highlighting each pixel based on its inclusion in a healthy tissue region or the diseased tissue region in the anatomical structure.

12. The method of claim 11, wherein the highlighted regions in the anatomical structure are displayed overlaying the image data.

13. The method of claim 1, further comprising comparing the rate of progression of the disease in the anatomical structure between at least one pair of longitudinal exams.

14. The method of claim 13, comprising displaying the rate of progression of the disease between the at least one pair of longitudinal exams, wherein the display comprises highlighting each pixel in the diseased tissue region of the at least one pair of longitudinal exams distinctly, and wherein the highlighting is an indication of the progression of the disease between the at least one pair of longitudinal exams.

15. A method for performing patient specific analysis of disease relevant changes of a disease in an anatomical structure of interest, the method comprising:
    acquiring image data corresponding to the anatomical structure of interest;
    identifying at least one healthy tissue region in the anatomical structure of interest, wherein identifying the healthy tissue region comprises applying a segmenting process to the image data, and wherein the segmenting process is based on the attenuation properties of the healthy tissue region;
    building a patient specific healthy tissue model based on one or more statistical measures associated with pixels in the identified healthy tissue region for a given patient;
    using the patient specific healthy tissue model to determine a percentage of the anatomical structure that is encompassed by a diseased tissue region;
    estimating an original amount of tissue present in the anatomical structure based on the patient specific healthy tissue model and a patient specific measurement of the volume of the anatomical structure;
    determining the amount or spatial distribution or a combination thereof of tissue volume variation due to the disease in the anatomical structure based on the percentage of the anatomical structure encompassed by the diseased tissue region and the estimated original amount of tissue; and
    displaying the percentage of the anatomical structure encompassed by the diseased tissue region.

16. The method of claim 15, wherein the percentage of the anatomical structure that is encompassed by a diseased tissue region is determined by applying a segmenting process to the image data.

17. The method of claim 16, wherein the segmenting process identifies the percentage of the anatomical structure encompassed by the diseased tissue region by classifying each pixel within the anatomical structure into either a healthy tissue region or a diseased tissue region within the anatomical structure, and wherein the classification is based on measuring a goodness of fit for each pixel within the anatomical structure with respect to the patient specific healthy tissue model.

18. The method of claim 15, wherein the original amount of tissue present in the anatomical structure of interest is estimated based on a pixel density in the patient specific healthy tissue model and the patient specific measurement of the volume of the anatomical structure.

19. The method of claim 15, wherein the original amount of tissue in the anatomical structure is estimated based on measuring a patient specific lung overinflation amount.

20. The method of claim 15, further comprising displaying the percentage of the anatomical structure encompassed by the diseased tissue region, wherein the displaying comprises highlighting each pixel based on its inclusion in a healthy tissue region or the diseased tissue region in the anatomical structure.

21. The method of claim 15, further comprising comparing the rate of progression of the diseased tissue region in the anatomical structure of interest between at least one pair of longitudinal exams.

22. The method of claim 21, further comprising displaying the rate of progression between the at least one pair of longitudinal exams, wherein the display comprises highlighting each pixel in the diseased tissue region of the at least one pair of longitudinal exams distinctly, and wherein the highlighting is an indication of the progression of the disease between the at least one pair of longitudinal exams.

23. At least one non-transitory computer-readable memory storage device for storing computer instructions for instructing a computer system for performing patient specific analysis of disease relevant changes of a given disease in an anatomical structure of interest, the computer instructions comprising:
    acquiring image data corresponding to the anatomical structure of interest;
    identifying at least one healthy tissue region in the anatomical structure of interest;
    building a patient specific healthy tissue model based on one or more statistical measures associated with pixels in the identified healthy tissue region for a given patient;
    determining a percentage of the anatomical structure that is encompassed by a diseased tissue region using the patient specific healthy tissue model;
    applying a segmenting process to the image data to determine the percentage of the anatomical structure that is encompassed by the diseased tissue region, wherein the segmenting process identifies the percentage of the anatomical structure encompassed by the diseased tissue region by classifying each pixel within the anatomical structure into either a healthy tissue region or a diseased tissue region within the anatomical structure;
    determining the amount or spatial distribution or a combination thereof of tissue volume variation due to the disease in the anatomical structure based on the percentage of the anatomical structure encompassed by the diseased tissue region and an estimated original amount of tissue; and
    displaying the percentage of the anatomical structure encompassed by the diseased tissue region based on the patient specific healthy tissue model of the healthy tissue region in the anatomical structure of interest.

24. A system for performing patient specific analysis of disease relevant changes of a given disease in an anatomical structure of interest, comprising:
- an imaging device configured to acquire image data corresponding to the anatomical structure; and
- an image processor coupled to the imaging device and configured to identify at least one healthy tissue region in the anatomical structure of interest; build a patient specific healthy tissue model based on one or more statistical measures associated with pixels in the identified healthy tissue region for a given patient; determine a percentage of the anatomical structure that is encompassed by a diseased tissue region using the patient specific healthy tissue model; apply a segmenting process to the image data to determine the percentage of the anatomical structure that is encompassed by the diseased tissue region, wherein the segmenting process identifies the percentage of the anatomical structure encompassed by the diseased tissue region by classifying each pixel within the anatomical structure into either a healthy tissue region or a diseased tissue region within the anatomical structure; and determine the amount or spatial distribution or a combination thereof of tissue volume variation due to the disease in the anatomical structure based on the percentage of the anatomical structure encompassed by the diseased tissue region and an estimated original amount of tissue.

* * * * *